(No Model.) 2 Sheets—Sheet 1.
L. G. GOODE.
ELECTRIC MOTOR.
No. 455,711. Patented July 7, 1891.
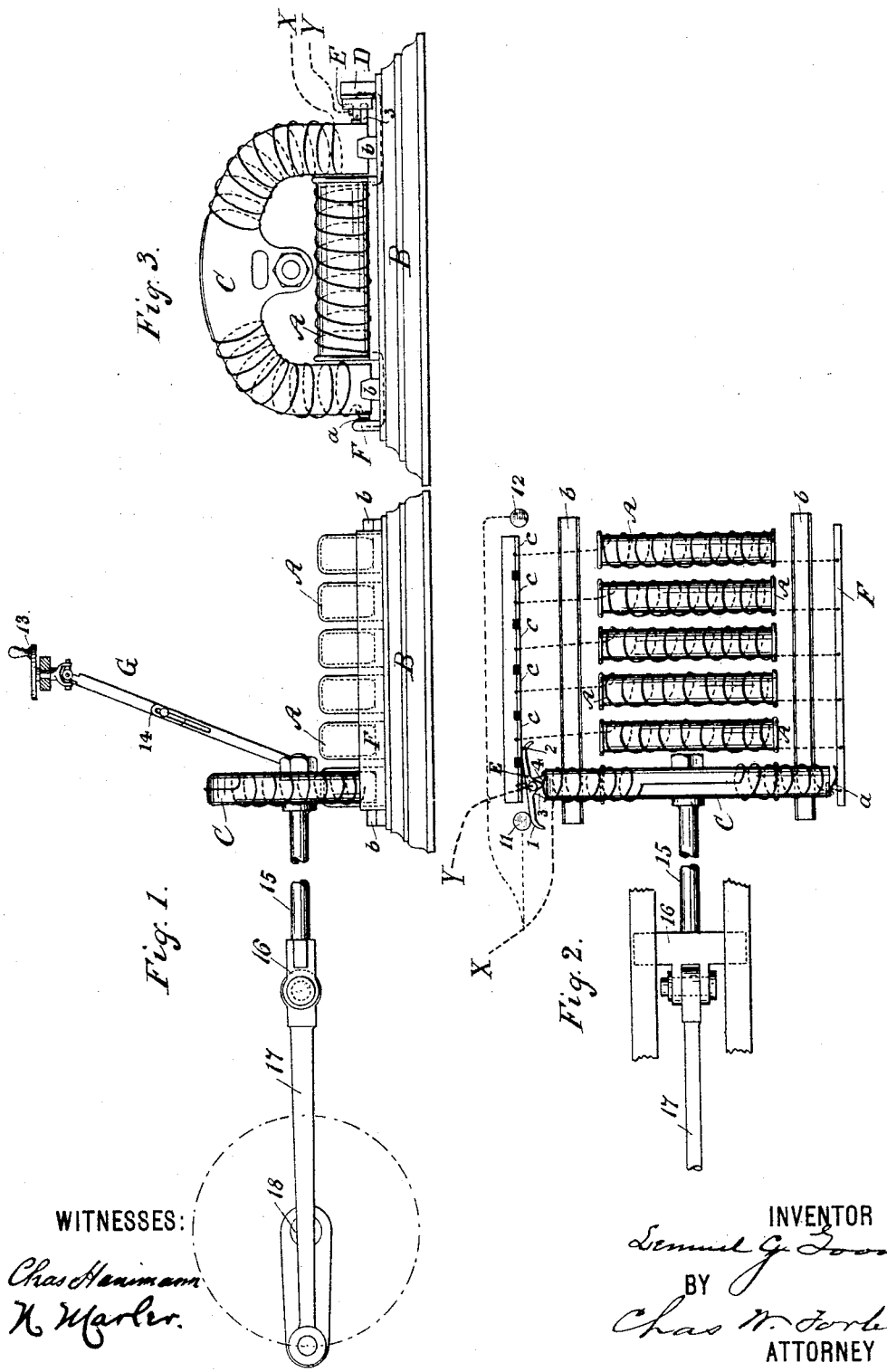
WITNESSES:
Chas Heinemann
K. Marler.
INVENTOR
Lemuel G. Goode
BY
Chas W. Forks
ATTORNEY

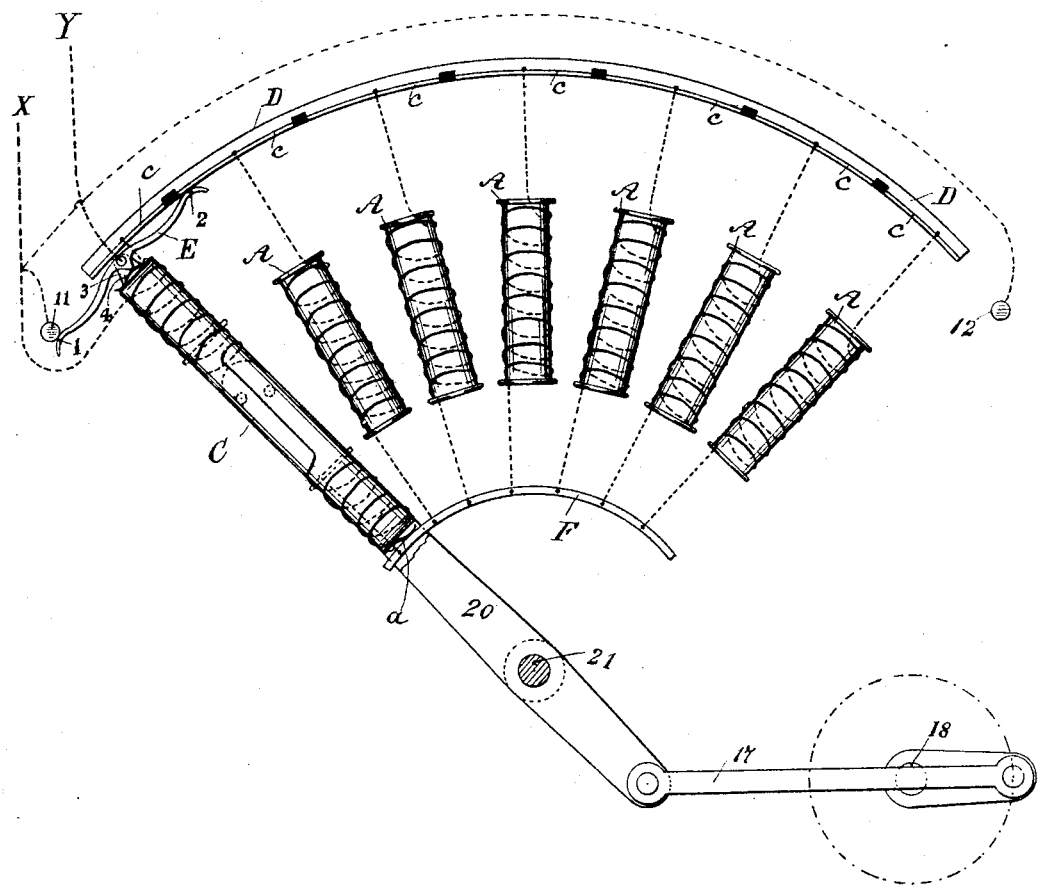

UNITED STATES PATENT OFFICE.

LEMUEL G. GOODE, OF JERSEY CITY, NEW JERSEY, ASSIGNOR TO THE PATERSON ELECTRICAL MANUFACTURING COMPANY, OF NEW JERSEY.

ELECTRIC MOTOR.

SPECIFICATION forming part of Letters Patent No. 455,711, dated July 7, 1891.

Application filed August 22, 1890. Serial No. 362,719. (No model.)

*To all whom it may concern:*

Be it known that I, LEMUEL G. GOODE, a citizen of the United States, residing at Jersey City, county of Hudson, and State of New Jersey, have invented certain new and useful Improvements in Electric Motors, of which the following is a specification.

This invention relates, generally, to electric motors, but more particularly to a reciprocating electric motor—that is to say, to an electric motor in which the moving armature reciprocates or oscillates back and forth within certain limits in contradistinction to those which rotate.

The object of the invention is to produce a simple and effective electric motor for use in driving machinery and mechanical devices generally, and in which counter electro-motive force is to a great extent obviated.

In the accompanying drawings, Figure 1 is a side elevation of a motor embodying the invention. Fig. 2 is a plan view of the same. Fig. 3 is an end view. Fig. 4 is an elevation of a modified form of the motor.

Referring to the drawings, it will be understood that the improved motor consists, essentially, of a series of stationary coils A, secured to a suitable base or support B, a reciprocating armature C, the poles of which are adapted to move past the respective poles of the coils, a commutator D, extending along in the direction of movement of the armature, a movable brush E, carried by the armature and adapted to bear upon the commutator, and a stationary contact-surface F, extending along adjacent to the movement of one of the poles of the armature and against which a brush $a$, carried by the armature, continually bears.

The base or support is provided with a pair of guideways $b$, upon which rests and slides the reciprocating armature C. This armature is shown in the form of a U-shaped magnet having one or more layers of wire coiled around it, as shown. The poles of the magnet are slotted to partially embrace the guideways so that the armature will move in a straight line. The coils A are secured to the upper surface of the bed-plate and extend laterally between the guides of the moving armature, a sufficient space being left between the poles of the coils and the guides for the passage of the poles of the magnet forming the armature. These coils extend along within the range of movement of the armature and each coil consists of a suitable core—such as soft iron or a bundle of wires—of the usual form and wound with a number of layers of wire.

The commutator extends along in the direction of movement of the armature and consists of a series of plates $c$, corresponding in number with the coils employed, there being one commutator-plate for each coil. These plates are supported upon the inner side of a suitably-insulated support and insulated from each other by a suitable substance—as, for instance, mica. The armature carries the movable brush E, having two contact-surfaces 1 2 for alternate contact with the commutator-plates. This brush is pivoted to a bracket 3, extending from the side of the moving armature, properly insulated from the armature, and is borne upon by a spring 4, which tends to hold the brush in either of its adjusted positions. At the limit of the movement of the armature in each direction and in the path of either end of the brush there are provided contact-studs 11 12, against which the ends of the brush will strike as the armature reaches the limit of its movement in either direction, so as to rock the brush on its pivot, removing one of its bearing-surfaces from contact with one of the commutator-plates and moving the other bearing-surface in contact with the adjacent plate, and thus automatically reverse the direction of movement of the armature. Upon the opposite side of the armature the continuous contact-surface F is arranged, against which constantly bears the brush $a$, carried by the end of the armature and properly insulated therefrom.

The motor is wired as follows: One end of the wire of each of the coils is connected to one of the commutator-plates $c$, and the opposite end is connected with the continuous stationary contact-surface F, and the brush $a$, bearing against said surface, is in electrical connection with one end of the coil wound upon the moving armature, the opposite end of which coil is in electrical connection with one of the line-wires X. The other line-wire Y is connected to the pivot of the movable brush E that bears upon the commutator-plates.

In the operation of the motor the current will enter the movable brush, and from the commutator-plate $c$, with which it is then in contact, will pass through the coil that is in electrical connection with said commutator-plate, thence to the continuous surface F through the brush $a$, bearing against said surface, and through the coil of the armature to the other line-wire X. The effect of this is to energize the coil situated next in advance of the armature in the direction of its movement, so as to cause the movement of that armature toward the coil thus energized, which, as soon as the armature arrives in this position, will have brought the contact-surface of the brush in contact with the next succeeding commutator-plate, thus breaking electrical connection with that coil and energizing the succeeding coil, which acts as the other one did to draw the armature toward it and still farther along in its direction of movement. As the armature arrives at the end of its stroke or adjacent to the last coil, the forward end of the brush, as 2, will strike the contact-stud 12, thereby rocking the brush upon its pivot and placing its opposite end in contact with the next adjacent or preceding commutator-plate, whereby the coil in rear of the armature is then energized, thus reversing the movement of the armature and causing it to move in the opposite direction, when a similar result takes place by the contact of the end 1 of the movable brush with the other contact-stud 11, whereby the brush is rocked and its opposite end put in contact with the preceding plate of the commutator. In order to prevent "sparking" while the movable brush is moved by contact with the studs 11 12 in the act of causing the reverse of the motor, said studs are in circuit shown with the line-wire X.

To be able to reverse the motor at any point of its stroke, there is provided a connection G with the pivot of the movable brush extending to a point about midway of the stroke of the armature, and provided with a hand-wheel 13, by which the brush may be rocked from that point. This connection consists of a connecting-rod 14, formed of two pieces connected together so that the rod may foreshorten and lengthen as the armature approaches and passes beyond its center of movement. One end of the rod is provided with a universal connection with the pivot of the brush and the opposite end is provided with a similar connection with a hand-wheel, so that in whatever position the armature may be the brush may be rocked to change the direction of the motor at any point intermediate of the limit of its stroke.

In order to transmit the movement of the armature, the armature is shown as provided with a rod 15, secured centrally thereto, the opposite end of which is provided with a head 16, adapted to slide between suitable guides, (not shown,) and is connected in any usual manner with one end of a connecting-rod 17, the opposite end of which is connected to the crank of a crank-shaft 18, mounted in suitable bearings, from which the motion of the motor may be transmitted to other devices by any preferred means.

In the structure just described the armature C reciprocates back and forth in a straight line. It is obvious that instead of so doing the armature C may be connected to one end of a pivoted lever, so as to reciprocate or oscillate in the arc of a circle, the coils and the commutator-plate being also arranged in the arc of a circle, so as to properly co-operate with the armature. Such a structure is shown in Fig. 4, wherein an armature of similar construction to that previously described is mounted at the end of a lever 20, pivoted at 21, the opposite end of which is connected by a connecting-rod 17 to a crank-shaft 18 in the usual way. In the path of the movement of the armature the stationary coils A are arranged, as before described, and the plates of the commutator D extend upon the outer side in the path of the moving brush E, and upon the opposite side of the armature the continuous contact-surface F is arranged, against which constantly bears the brush $a$. As the operation of the motor as thus modified is substantially the same as the one previously described, no further detailed description of the same is deemed necessary. It should be stated in passing that the coils and armature may be duplicated and placed alongside one another, the armatures being connected to move together.

What is claimed is—

1. The combination of an electric circuit, a plurality of stationary coils, a reciprocating or oscillating armature, a commutator, a movable brush carried by the armature and having two contact-surfaces for alternate contact with the commutator, and means for automatically moving the brush to change the position of its contact-surfaces for reversing the direction of the armature, substantially as described.

2. The combination of an electric circuit, a plurality of stationary coils, a reciprocating or oscillating armature, a commutator, a brush pivotally mounted on the armature and having two contact-surfaces for alternate contact with the commutator, and contact-studs in the path of the contact-surfaces of the brush for reversing the direction of the armature, substantially as described.

3. The combination of an electric circuit, a plurality of stationary coils, a reciprocating or oscillating armature, a commutator, a brush carried by the armature, and universal-joint connections with the brush for moving it to reverse the motor from a distant point, substantially as described.

4. The combination of an electric circuit, a plurality of stationary coils, a reciprocating or oscillating armature, a commutator, a brush pivoted upon the armature, contact-studs in the path of the brush for reversing the direction of movement of the armature, and connections with the brush for moving it from a distant point, substantially as described.

5. The combination of an electric circuit, a plurality of stationary coils, an oscillating armature, a commutator at one side of the coils and armature, a brush pivotally mounted upon the armature having two contact-surfaces for alternate contact with the commutator, studs for changing the position of the brush in circuit with one of the line-wires, a continuous contact-surface arranged upon the opposite side of the stationary coils and armature, and a brush $a$, carried by the armature, constantly bearing against the contact-surfaces, substantially as described.

LEMUEL G. GOODE.

Witnesses:
GEO. H. GRAHAM,
N. MARLEN.